(12) United States Patent
Valerio et al.

(10) Patent No.: US 9,298,867 B2
(45) Date of Patent: Mar. 29, 2016

(54) MODULAR SYSTEM AND METHOD FOR SIMULATING PERFORMANCE OF AN ELECTRICAL DEVICE

(75) Inventors: Hector A. Valerio, Royal Oak, MI (US);
Nathaniel Jennings, Detroit, MI (US);
Victor Lau, Farmington Hills, MI (US);
Nicole Gonzalez, Sterling Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 951 days.

(21) Appl. No.: 13/530,206

(22) Filed: Jun. 22, 2012

(65) Prior Publication Data

US 2013/0346052 A1    Dec. 26, 2013

(51) Int. Cl.
*G06F 17/50* (2006.01)
*G06G 7/62* (2006.01)

(52) U.S. Cl.
CPC ........ *G06F 17/5036* (2013.01); *G06F 2217/78* (2013.01)

(58) Field of Classification Search
CPC ............ G06F 17/5022; G06F 17/5036; G06F 2217/78
USPC ......................................................... 703/13
See application file for complete search history.

(56) References Cited

U.S. PATENT DOCUMENTS

2010/0052615 A1*  3/2010  Loncarevic ................... 320/118

FOREIGN PATENT DOCUMENTS

| CN | 101908657 A | 12/2010 |
|---|---|---|
| CN | 102183984 A | 9/2011 |
| CN | 102298117 A | 12/2011 |
| CN | 202075399 U | 12/2011 |
| CN | 102411128 A | 4/2012 |
| JP | 2008157837 A | 7/2008 |
| KR | 20050005694 A | 1/2005 |
| WO | 2012043592 A1 | 4/2012 |

OTHER PUBLICATIONS

Dai, Haifeng, et al. "A Hardware-in-the-Loop System for Development of Automotive Battery Management System." Feb 14, 2012, Measuring Technology and Mechatronics Automation in Electrical Engineering. Springer New York, 2012. 27-36.*

* cited by examiner

*Primary Examiner* — Eunhee Kim
(74) *Attorney, Agent, or Firm* — Quinn Law Group, PLLC

(57) ABSTRACT

A system for simulating operation of an electrical device includes a printed circuit board assembly (PCBA) and a host machine. The PCBA includes a communications module, modular power switching modules (PSMs), and modular cells. Using an associated method, each PSM applies a predetermined pulse width modulation (PWM) duty cycle to AC input power to generate a calibrated DC output voltage. The cells, which are connected to a respective PSM, include a microcontroller. The host machine transmits a controller area network (CAN) cell state message to the communications module. The communications module converts the cell state messages into corresponding serial messages, and transmits the serial messages to the microprocessors of the cells to cause the cells to set their states to the desired simulation state. The cells generate the desired simulation state using PWM and transmit a cell status message back to the host machine via the communications module.

17 Claims, 3 Drawing Sheets

US 9,298,867 B2

MODULAR SYSTEM AND METHOD FOR SIMULATING PERFORMANCE OF AN ELECTRICAL DEVICE

TECHNICAL FIELD

The present disclosure relates to a modular system for simulating the performance of an electrical device, and to a method of using such a system.

BACKGROUND

Testing for the purpose of validating the performance of relatively large and complex electrical systems can be a challenging task. For instance, a multi-cell battery pack is used to store the high-voltage electrical energy needed for powering certain vehicles in an electric-only or an electric assist mode. In some lithium-ion rechargeable battery pack designs, the battery pack may contain dozens of individual battery cells. Associated high-voltage components such as a traction power inverter module and an auxiliary power module also undergo rigorous bench testing during all phases of vehicle development. Typically, such testing is directly performed on a large calibration unit within a laboratory environment.

SUMMARY

A system is disclosed herein that simulates a complex electrical device such as the multi-cell battery pack noted above. The system facilitates testing and failure mode duplication of the electrical device. By using the present approach, a calibration unit in the form of a multi-cell battery pack is not required. This reduces space- and component-related costs while minimizing other concerns associated with working with high-voltage equipment in a laboratory environment. Thus, the system disclosed herein provides an electronic facsimile of the electrical device whose performance is being tested.

Within the system, a user interface to a host machine may be used to facilitate setup of test requirements which simulate a desired state of each of a plurality of modular cells. For example, the system may simulate, for each modular cell, a predetermined voltage level, an open circuit, a short circuit, or a default/load circuit. The system may also instruct the various modular cells to read and report their respective voltage or current levels back to the host machine. The modular cells used in the system may be readily updated simply by modifying the control code executed by the host machine, a step which in turn updates the firmware of a dedicated microprocessor used in each of the modular cells.

In particular, a system is disclosed herein for simulating an operation of an electrical device. The system includes a host machine and at least one printed circuit board assembly (PCBA) having a power connector that is electrically connectable to an input power supply. In other embodiments, a cabinet may define multiple bays, each of which contains a PCBA within a removable rack. Each PCBA includes a communications module, a plurality of power switching modules (PSMs) that convert the input power from the input power supply to a calibrated DC voltage, and the modular cells noted above. Each modular cell is connected to a respective one of the modular PSMs to ensure magnetic isolation of the cells from every other cell. The microcontroller of each cell is individually-addressable by the communications module.

The host machine selectively transmits a cell state message to one or more of the modular cells via the communications module, e.g., as a controller area network (CAN) message using the CAN protocol, with each of the cell state messages including at least a cell address and a desired simulation state. The communications module receives and converts the cell state messages into a corresponding set of serial messages, and transmits the serial messages to the microprocessors of the respective cells. In turn, the cells respond to the serial messages by setting their internal state to the desired state as instructed in the serial message, and to transmit a cell status message back to the host machine via the communications module. The cell status message may report at least one of a voltage level and a current level of the respective cells.

The above features and advantages and other features and advantages of the present invention are readily apparent from the following detailed description of the best modes for carrying out the invention when taken in connection with the accompanying drawings.

DETAILED DESCRIPTION

Figure 1:
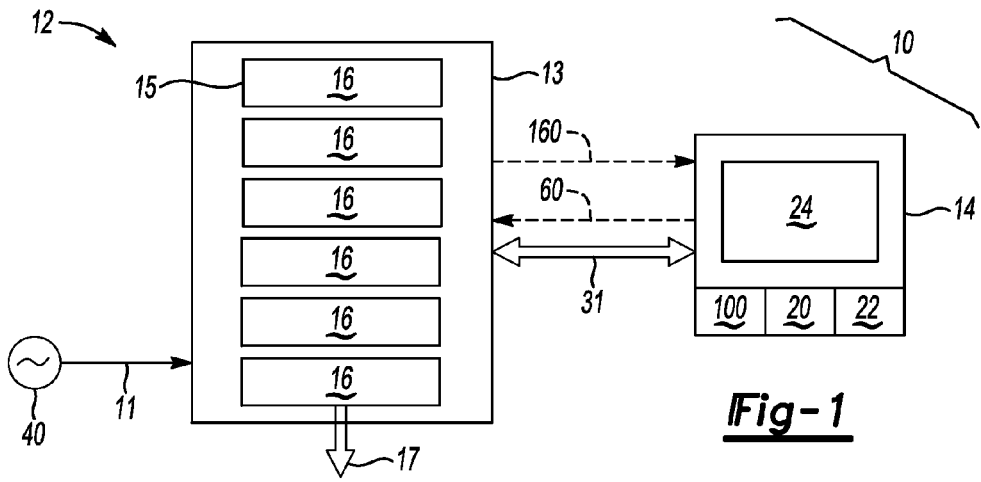
FIG. 1 is a schematic illustration of an example system for simulating the performance of an electrical device.

Referring to the drawings, wherein like reference numbers correspond to like or similar components throughout the several figures, a system 10 is shown schematically in FIG. 1. The system 10 may include, as its primary components, a cabinet assembly 12 and a host machine 14. The system 10 as a whole simulates the operation and functionality of an electrical device, for instance a multi-cell vehicle battery pack as noted above. By providing an electronic facsimile of the modeled electrical device, the system 10 can be used to closely mimic the electrical behavior the device, e.g., by mimicking the behavior of each of a plurality of different battery cells.

The cabinet assembly 12 is energized by an external alternating current (AC) power supply 40, e.g., a conventional 110 VAC wall socket. AC line power (arrow 11) is thus delivered directly to the cabinet assembly 12. A switch (not shown) may be used to selectively power the cabinet 12 on and off for testing as needed.

A communications bus 31 such as a controller area network (CAN) bus may be used to connect the cabinet assembly 12 to the host machine 14. The communications bus 31 may employ any communications protocol that is fully compatible with the On-Board Diagnostics (OBD-II) vehicle diagnostics standard, or alternatively with the European On Board diagnostics (EOBD) standard.

Within the cabinet assembly 12, a cabinet 12 of aluminum or other suitable material defines plurality of bays 15, i.e., elongated openings or slots. Each bay 15 contains a respective rack 16. In turn, each rack 16 forms a drawer that may be withdrawn from a respective bay 15 as indicated by arrow 17. In the example embodiment shown in FIG. 1, the system 10 is configured as an Intelligent Cell Battery Pack Simulator (ICBPS), i.e., a system specially configured to emulate the performance of a 96-cell battery pack. Such a battery pack may be used to store relatively high voltage power, e.g., about 60VDC to 360VDC or higher depending on the design, as a ready source of power suitable for energizing an electric traction motor in a vehicle. However, other multi-cell electrical systems may be readily envisioned, e.g., a battery pack having more or fewer than 96 cells, or any other electrical device that may be modeled as set forth herein.

The example host machine 14 shown in FIG. 1 may be configured as a digital computer having a processor 20, tangible, non-transitory memory 22, and a user interface 24. The memory 22 may be embodied as read only memory (ROM), electrically-programmable read only memory (EPROM), flash memory, CD-ROM, and the like. The host machine 14 may also include sufficient random access memory (RAM), a high-speed clock, analog-to-digital (A/D) and digital-to-analog (D/A) circuitry, any required input/output circuitry and devices (I/O), and appropriate signal conditioning and buffer circuitry.

Any computer-executable code resident in the host machine 14 or accessible thereby, including any code embodying a method 100 as described below with reference to FIG. 5, may be stored in memory 22 and executed by the processor 20 to provide the required simulation functionality as set forth herein. Execution of the code embodying the method 100 results in transfer of cell state messages (arrow 60) from the host machine 14 to the racks 16 of the cabinet assembly 12, as well as transfer of cell status messages (arrow 160) from the racks 16 back to the host machine 14 as described in detail below.

Figure 2:
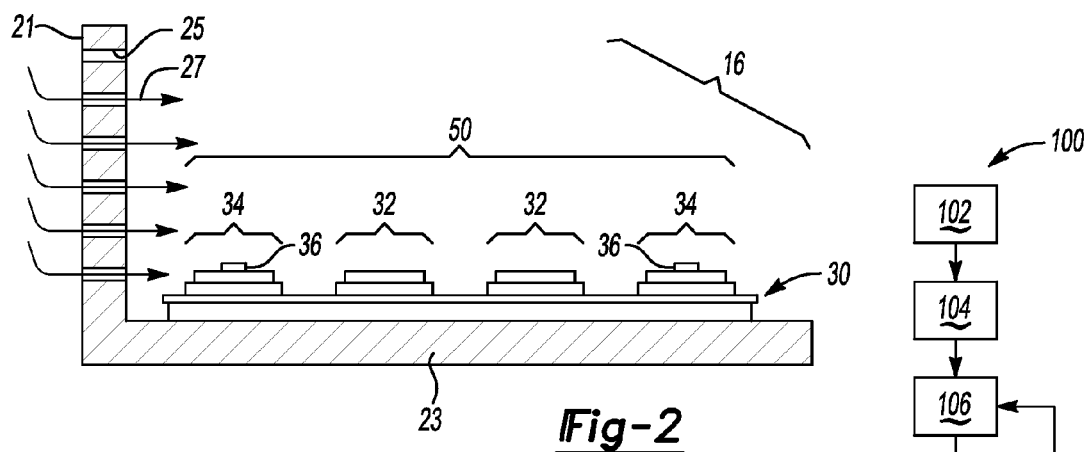
FIG. 2 is a schematic side view illustration of a rack useable within a cabinet of the system shown in FIG. 1.

Referring to FIG. 2, an example rack 16 is depicted in side view. A plurality of such racks 16 may be used within the system 10 of FIG. 1, with each rack 16 being identically configured. The rack 16 may include a perforated face plate 21 and a bottom plate 23, with the face plate 21 and the bottom plate 23 being orthogonally arranged as shown. Openings 25 defined by the face plate 21 allow air (arrows 27) to circulate with respect to a printed circuit board assembly (PCBA) 50 of the rack 16. While not shown in FIG. 2, a fan may be used within the cabinet 13 of FIG. 1 to draw the air (arrows 27) toward the PCBA 50 for cooling of the various circuit components used to form the PCBA 50. Other cooling designs may be used without departing from the intended inventive scope.

Within each rack 16, a plurality of power switching modules (PSMs) 32 and an equal plurality of intelligent modular cells 34 are mounted to a circuit backboard 30. Each of the modular cells 34 is electrically connected to a respective one of the PSMs 32, such that each PSM 32 acts as a dedicated/individual switching power supply for a corresponding modular cell 34. This helps to ensure the magnetic isolation of each modular cell 34 from all other modular cells 34 used on the PCBA 50. In an alternative embodiment, the PSMs 32 may be included within the modular cells 34, e.g., as an integral power supply chip. For illustrative consistency, each of the PSMs 32 will be described hereinafter as being separate from the modular cells 34.

Additionally, each of the modular cells 34 shown in FIG. 2 has a unique address within its respective rack 16. A microcontroller 36 is included within each modular cell 34 to allow each modular cell 34 to be individually addressed during simulation testing, as is explained in detail below with reference to FIGS. 3 and 3A. The modular cells 34 include a semiconductor switch 65 (see FIG. 3) that is used to apply pulse width modulation (PWM) to an input voltage provided by a respective PSM 32 for that modular cell 34. An embodiment of the modular cell 34 is described below with reference to FIG. 4.

Figure 3A:
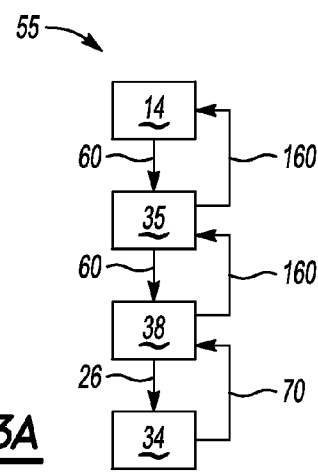
FIG. 3A is a schematic flow diagram describing an example communication sequence occurring within the PCBA shown in FIG. 3.
Figure 3:
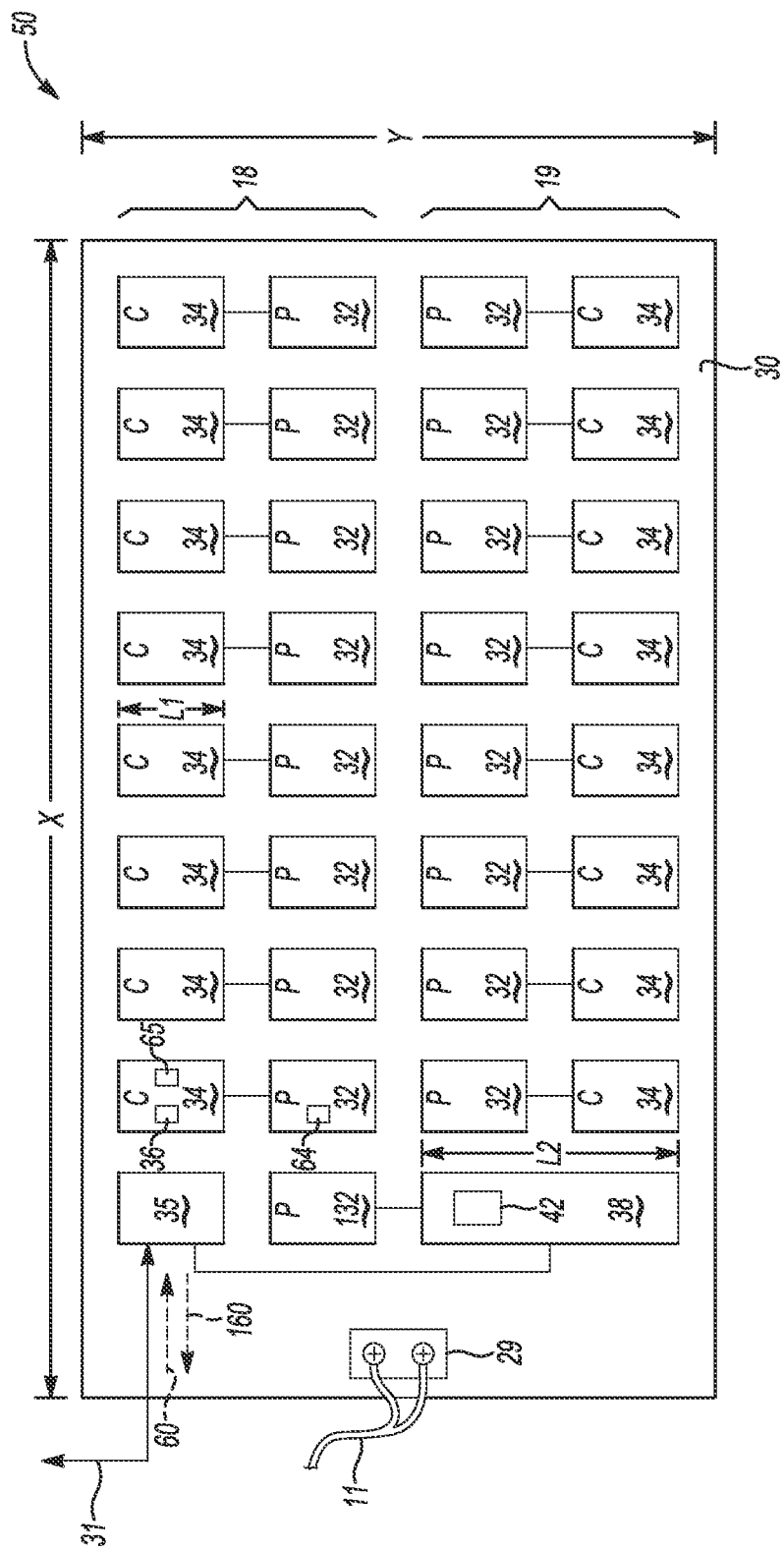
FIG. 3 is a schematic plan view illustration of a printed circuit board assembly (PCBA) that is usable as part of the example rack shown in FIG. 2.

Referring to FIG. 3, the PCBA 50 includes a power connector block 29 that ties the AC line power 11 to a main PSM 132. The main PSM 132 acts as an individual switching power supply for a communications module 38, but is otherwise configured identically to the various PSMs 32 used on the remainder of the PCBA 50. The communications module 38 receives cell state messages (arrow 60) and transmits cell status messages (arrow 160) via the communications bus 31 as explained below with reference to FIG. 3A.

Each PSM 32, 132 uses a semiconductor switch 64 or multiple such switches to apply PWM to provide a regulated DC output voltage to the modular cells 34, e.g., using bipolar junction transistors (BJTs), metal-oxide-semiconductor field-effect transistors (MOSFETs), inverted gate bipolar transistors (IGBTSs), etc. The regulated output voltage may be delivered at any required level that is appropriate for the particular semiconductor devices used to form the semiconductor switch 64, e.g., 5VDC or 6VDC, and an output current of up to 1 A. The modular cells 34 use another semiconductor switch 65 to provide the requested voltage during simulation. An example of the semiconductor switch 65 is set forth below with reference to FIG. 4.

As is well understood in the art, PWM duty cycle describes the proportion of time in which power to a given component is on, i.e., a duty cycle of 0% corresponds to full-off and 100% corresponds to full-on. Thus, each PSM 32,132 and each modular cell 34 is configured to operate at a required duty cycle for generating the required output voltage, with the PSMs 32 delivering this output voltage to a corresponding modular cell 34, the PSM 132 delivering the output voltage to the communications module 38, and the modular cells 34 setting themselves to the desired output voltage to simulate a particular cell state.

Each PSM 32, 132 thus has two main functions: to provide two voltage levels, e.g., a regulated 5VDC or 6VDC voltage and an unregulated higher voltage, as well to provide magnetic isolation of the modular cells 34 from each other. That is, each modular cell 34 has its own dedicated PSM 32 such that other modular cell 34 shares a PSM 32 in all embodiments, regardless of the whether the PSM 32 is a separate circuit board or an integral microchip that resides within the modular cell 34.

An input/output (I/O) card 35 may be used to connect the PCBA 50 to the host machine 14 shown in FIG. 1 via the communications bus 31. Thus, AC line power 11 is provided to the PCBA 50 via the power connector block 29 while communications are established between the PCBA 50 and the host machine 14 via the I/O card 35.

In a particular embodiment, the arrangement of the modular cells (C) 34 and PSMs (P) 32 of FIG. 3 is symmetrical with respect to the length (X) and width (Y) of the PCBA 50. For instance, in an embodiment in which a given rack 16 (see FIGS. 1 and 2) includes a PCBA 50 having exactly sixteen modular cells 34, a first row 18 of eight cell/PSM pairs may be arranged parallel to an identical second row 19 of eight cell/PSM pairs. In the same embodiment, the communications module 38 may have a length (L2) that is twice the length (L1) of a given modular cell 34. The I/O card 35 may have the same length as each of the modular cells 34, such that arrangement on the PCBA 50 is perfectly symmetrical with respect to the surface of the circuit backboard 30. As noted above, the modular cells 34, as well as the communications module 28 and the PSMs 32, 132, are all modular, thus enabling these components to be easily replaced simply by detaching pins (not shown) on the underside of the components from mating receptacles or headers in the circuit backboard 30.

Referring to FIG. 3A, an example logic flow diagram 55 illustrates the basic communication flow occurring between the host machine 14 of FIG. 1 and certain components of the PCBA 50 shown in FIG. 3. When a desired cell state message (arrow 60) is transmitted to the PCBA 50 by the host machine 14 via the communications bus 31, the cell state message (arrow 60) may be in the form of a CAN message. Thus, the well-known CAN protocol may be used to control communications occurring between the host machine 14 and each of the racks 16 (see FIG. 1).

The CAN message that embodies the cell state message (arrow 60) for a given modular cell 34 of FIG. 3 may be in the format [rack #, cell #, action], wherein "rack #" identifies the specific rack 16 within the cabinet 13 of FIG. 1 that is to receive that message (arrow 60), "cell #" identifies the particular cell 34 within that rack 16, and "action" defines the state or action which is required of that particular cell 34. For instance, the required action may be a reading of the voltage or current of the modular cell 34, a simulation of an open-circuit or short-circuit condition, a default voltage state, another voltage state other than default, etc.

Once the cell state message (arrow 60) is received by the I/O card 35, the cell state message (arrow 60) is relayed to the communications module 38. The control module 38 responds by converting the cell state message (arrow 60) into a serial message (arrow 26), e.g., an RS-232 message, which is communication to the modular cell 34 identified in the cell state message (arrow 60). In this manner, each of the modular cells 34 is sequentially and individually addressed.

The modular cell 34 thereafter responds back to the communications module 38 via a reply message (arrow 70), which is also a serial message. The reply message (arrow 70) provides a status of that particular modular cell 34, e.g., a reading of its voltage and/or current level after executing the requested state communicated to that modular cell 34 via the cell state message (arrow 60). The communications module 38 thereafter converts the reply message (arrow 70) into the cell status message 160, which may be transmitted back to the host machine 14 via the I/O card 35 as a CAN message like the original cell state message (arrow 60).

The present approach provides an overview of an approach for simulating the performance of an electrical device. The example method 100 of FIG. 5 describes an embodiment in which the system 10 of FIG. 1 is configured to emulate the performance of a 96-cell battery pack for an electric, hybrid electric, or extended-range electric vehicle. Those of ordinary skill in the art will appreciate that the present method 100 may be adapted for use with simulations of other electrical devices without departing from the intended inventive scope. All steps in the method 100 are explained below with reference to the structure described above with reference to FIGS. 1 and 2.

Figure 4:
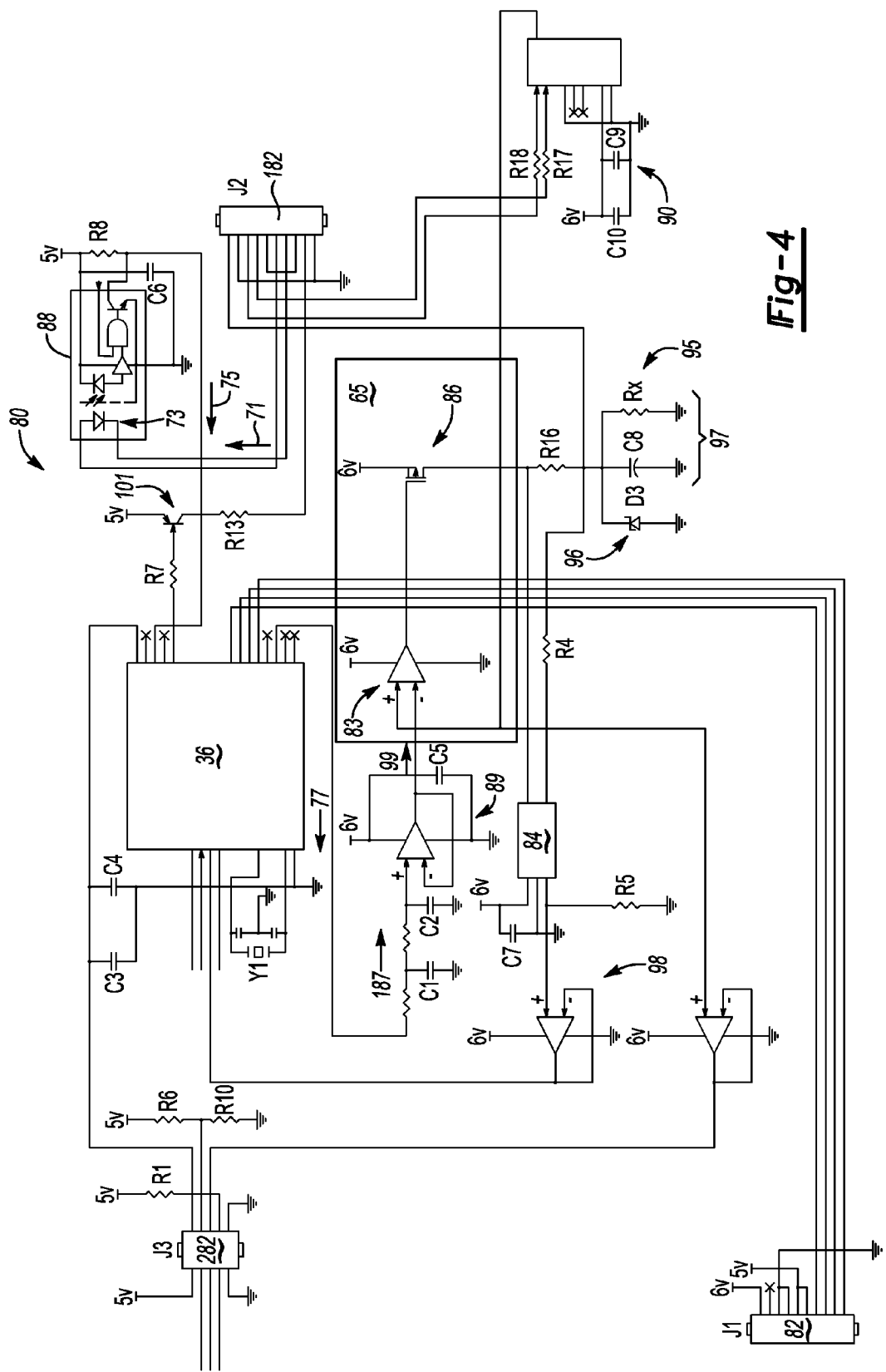
FIG. 4 is a schematic circuit diagram describing one possible embodiment of a modular cell that may be used within the system of FIG. 1.

The cell 34 of the preceding FIGS. 2, 3, and 3A may be embodied as a printed circuit board assembly, an example circuit diagram 80 for which is shown in FIG. 4. Those of ordinary skill in the art will understand the various circuit symbols used in the circuit diagram 80, i.e., R (resistor), C (capacitor), D (diode), T (transistor), etc. Other circuit components are described with associated reference numbers for added illustrative clarity. Values for the various circuit components may vary with the design and the required functionality as described below. The ranges described herein are thus illustrative of the particular example shown in FIG. 4, and are not intended to be limiting.

By connecting headers 82, 182, and 282 (J1, J2, J3, respectively) to mating headers (not shown) of the backboard 30 (see FIGS. 2 and 3), the microcontroller 36 is placed in communication with other components of the PCBA 50 of FIG. 3. The microcontroller 36, which controls the overall functionality of a given modular cell 34, may be embodied as a PIC16F690 device in a particular embodiment, or as any other microcontroller device that can be individually addressed via the host machine 14 and communications module 38 of FIGS. 1 and 2. Various pins of the microcontroller 36 may receive and output signals as needed, including inputs such as a clock signal from a resonator 85 and serial messages from the communications module 38 of FIG. 1. The serial messages (arrow 26 of FIG. 3A) from the communications modules 38 may be transmitted to the microcontroller 36 via the header 82 (J1). The header 282 (J3) allows for in-circuit serial programming, such that the microcontroller 36 may be easily updated via firmware updates from the host machine 14 as needed.

The header 182 (J2) selectively outputs a voltage drive signal (arrow 71) to an optocoupler 88. A photodiode 73 of the optocoupler 88 is energized in response to the drive signal (arrow 71), which turns on the optocoupler 88. An output signal (arrow 75) from the optocoupler 88 is received by the microcontroller 36 to initiate the simulation function of the modular cell 34. Thus, use of the optocoupler 88 ensures that the modular cell 34 remains optically isolated from the master controller, i.e., from the host machine 14 of FIG. 1.

The semiconductor switch 65 as described briefly above is another primary component of the circuit 80 of FIG. 4. The particular embodiment shown in FIG. 4 uses a p-channel MOSFET 86 of the type known in the art, although other semiconductor devices such as IGBTs or BJTs may also be used with minor circuit revisions that would be understood by those having ordinary skill in the art. With the p-channel MOSFET 86 in particular, voltage drop is minimized relative to other semiconductor devices such as a BJT, which may provide performance advantages in certain applications.

Functionally, the microcontroller 36 responds to a received serial message by generating a PWM signal (arrow 77) that is DC-rectified by a double-pole RC circuit 87. A rectified output signal (arrow 187) from the RC circuit is then buffered via a buffer circuit 89 to reduce signal noise, and is then fed as a buffered PWM signal (arrow 99) into a comparator 83 of the semiconductor switch 65. The comparator 83 compares the output voltage (arrow 91) from an instrumentation op-amp circuit 90 and the output of the buffer circuit 89, with the op-amp circuit 90 reading the actual voltage output for the modular cell 34, a value that may be lower than expected due to resistive losses occurring within or external to the modular cell 34 of FIG. 3.

If the comparator 83 of the semiconductor switch 65 shown in FIG. 4 sees an output voltage (arrow 91) from the instrumentation op-amp circuit 90 that is less than the buffered PWM signal, the comparator 83 may request an increase in voltage by turning on the MOSFET 86, or by turning on another semiconductor device in other embodiments. Likewise, the comparator 83 may request a decrease in voltage by turning off the MOSFET 86.

Other circuit components used within the modular cell 34 embodied as shown in FIG. 4 may include a protection circuit 95 having elements such as a Zener diode 96 (D3), e.g., an SB240E Schottky barrier rectifier, that protects from an inrush of electrical current in a system having multiple modular cells 34 connected in series, and a capacitor/resistor pair 97 (C8, Rx) that helps stabilize operation of the modular cell 34. A current monitor 84 and a buffer 98 may also be used in conjunction with other circuit elements to provide the desired response of the modular cell 34 within the system 10 of FIG. 1.

In an example embodiment using the circuit shown in FIG. 4, the following values may be used with a 6VDC regulated voltage to the microcontroller 36. R1 may be 4.7 kΩ while resistors R2 and R3 may be 10 kΩ. Resistors R4-R6 and R10 may have calibrated values, and thus may be embodied as variable resistors to provide the desired gains within the circuit shown in diagram 80. R7 and R8 may each be 2.2 kΩ resistors. Additionally, R13 may be 390Ω, R16 may be 0.1 kΩ and R17 and R18 may be 4.02 kΩ each.

For the capacitors, C1 and C2 may be 0.33 μF each, while capacitors C3 and C10 may be 10 μF. Capacitors C4-C7 and C9 may be smaller devices, e.g., 0.1 μF each. The capacitance of capacitor C8 is a calibration value. However, the selected value should be very high relative to the other capacitors shown in FIG. 4 to provide the desired functionality of the protection circuit 95. The resonator 85 (Y1) may resonate at about 20 MHz, while the transistor 101 shown adjacent to the resistor R7 may, in the same embodiment, be configured as an MMBT3906 pnp-type small signal surface mount transistor. Each of the op amps shown in FIG. 4 may be embodied as MCP6004 devices, i.e., as a quad general purpose op amp offering rail-to-rail input and output over the 1.8 to 6V operating range, as is well known in the art. Once again, the actual values provided for each of the circuit elements used in a physical embodiment of the modular cell 34 may vary with the design, and therefore the foregoing values are merely illustrative.

Figure 5:
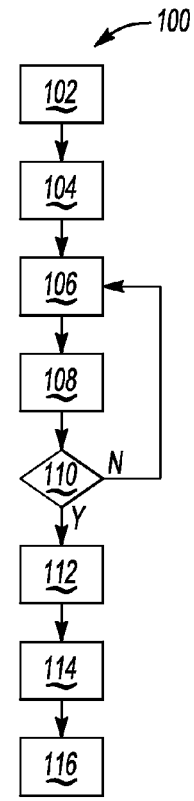
FIG. 5 is a flow chart describing an example method for simulating the performance of an electrical device using the system shown in FIG. 1.

Referring to FIG. 5, and beginning with step 102, after connecting the host machine 14 to the cabinet assembly 12 and connecting line power 11 to the cabinet 13, all of which are shown in FIG. 1, the PSM 132 of FIG. 2 converts AC line power 11 to a calibrated DC voltage, e.g., 6VDC. Conversion may be accomplished via PWM as is well understood in the art. A current of less than about 1 A may be delivered by each PSM 32, 132 to the particular component energized by that particular PSM 32, 132, e.g., the communications module 38 or any of the modular cells 34 shown in FIG. 3.

At step 104, a user of the host machine 14 of FIG. 1 may select a desired simulation sequence or cell state. Step 104 may entail launching a suitable software application such as Vehicle Spy Professional sold by Intrepid Control Systems, Inc. of Madison Heights, Mich. Using such a tool, and/or by programming a similar application using, for instance, C++, a user may select the particular modular cells 34 of each of the various PCBAs 50, select a simulation state for the selected modular cells 34, and transmit the cell state message (arrow 60 of FIGS. 3 and 3A) to the communications module 28.

By way of example, step 104 may entail selecting a cell voltage of between 0 and 2.7VDC, or any other voltage up to the regulated voltage output of the PSM 32, 132. As noted above, step 104 may include selecting a voltage value that simulates an open circuit or a short circuit. Other modular cells 34 may be commanded to read and report their voltage levels and/or current levels in response to the commanded states of other modular cells 34. Various programming windows may be displayed via the user interface 24 of FIG. 1 to facilitate step 104, such as by programming a set of pull-down menus with such commands as "rack #", "cell #", and "action" as exemplified above, or by selecting analog values such as the current or voltage command for a given cell 34 in mA or mV, respectively.

At step 106, once the simulation state message (arrow 60 of FIGS. 3 and 3A) has been transmitted by the host machine 14 of FIG. 1, the communications module 28 receives and converts this message to a serial message, e.g., RS-232 or any other cost-effective standard. Once the received message is converted, the method 100 proceeds to step 108.

At step 108, the communications module 38 transmits the serial message 26 to the microcontroller 36 of a given modular cell 34. For instance, step 106 may include transmission of a serial message 26 instructing a particular modular cell 34 to set its voltage to 2.0VDC. The method 100 proceeds to step 110 once the serial message 26 has been transmitted.

At step 110, the communications module 28 determines whether all of the modular cells 34 in a given rack 16 have received a serial message 26 for the present simulation. If not, the method 100 repeats step 106. The method 100 proceeds to step 112 once all serial messages 26 have been transmitted to the modular cells 34 of a given rack 16.

At step 112, upon receipt of the serial message 26, a modular cell 34 receiving the serial message 26 responds by implementing PWM on the voltage input from the corresponding PSM 32. That is, the modular cell 34 responds by executing the required PWM duty cycle, as determined by the microcontroller 36 for that modular cell 34, for achieving its required state. Those of ordinary skill in the art will appreciate that various semiconductor switching approaches exist for embodying PWM, e.g., the use of MOSFETs or IGBTs. The modular cells 34 may have 10-bit resolution in one embodiment, and thus may output any requested voltage ranging from 0VDC to the calibrated voltage level of the corresponding PSM 32 for that modular cell 34, e.g., 4.95VDC in increments of 4.95 mV when the corresponding PSM 32 outputs a 5VDC regulated voltage.

At step 114, each modular cell 34 may respond back to the communications module 28 with a reply message 70 (see FIG. 3A), e.g., by reporting the voltage and/or current level of that particular modular cell 34.

At step 116, the communications module 28 converts the received reply message 70 as shown in FIG. 3A into a cell status message 160 as shown in the same Figure. Step 116 may entail transforming the reply message 70 into a CAN message. The host machine 14 may then record the responses for all of the modular cells 34 used in the cabinet assembly 12 of FIG. 1, and thereafter determine the response of the modeled system to the particular faults or cell states that were simulated in steps 102-114.

While the best modes for carrying out the invention have been described in detail, those familiar with the art to which this invention relates will recognize various alternative designs and embodiments for practicing the invention within the scope of the appended claims.

The invention claimed is:

1. A system for simulating an operation of an electrical device, the system comprising:
    a printed circuit board assembly (PCBA) that is electrically connectable to AC input power, and that includes:
        a communications module;
        a plurality of modular power switching modules (PSMs) each of which includes a first semiconductor switch that applies a predetermined pulse width modulation (PWM) duty cycle to the AC input power to thereby generate a calibrated DC output voltage;
        a plurality of modular cells, each of which is connected to a respective one of the modular PSMs to thereby magnetically isolate each modular cell from all of the other modular cells, wherein each modular cell includes a second semiconductor switch and an individually-addressable microcontroller in networked communication with the communications module; and a host machine that is in communication with the modular cells of the PCBA via the communications module;
wherein:
the host machine is configured to transmit a cell state message for each of the modular cells to the communications module using a controller area network (CAN) protocol, with each of the cell state messages including at least a cell address and a desired simulation state;
the communications module is configured to receive and convert the cell state messages into a corresponding set of serial messages, and to transmit the serial messages to the microcontrollers of the respective modular cells to thereby cause the modular cells to set their state to the desired simulation state; and
the modular cells are configured to generate the desired simulation state using PWM via the second semiconductor switch, and to transmit a serial cell status message back to the host machine via the communications module, with the serial cell status messages reporting at least one of a voltage level and a current level of the respective modular cells.

2. The system of claim 1, further comprising a cabinet defining a plurality of bays, wherein each PCBA is mounted on a rack that is positioned within a respective one of the bays.

3. The system of claim 2, wherein each of the racks includes a perforated face.

4. The system of claim 1, wherein the communications module is configured such that the communications module automatically converts each of the received cell state messages into a respective RS-232 serial message.

5. The system of claim 1, wherein the microcontroller for each of the modular cells is a PIC16F690 device.

6. The system of claim 1, wherein each PSM is a switching power supply that converts an AC signal from the AC power supply, via PWM, to an output voltage of less than about 6VDC.

7. The system of claim 1, wherein the host machine includes a user interface that receives a state selection requesting one of an open-circuit voltage level, a short-circuit voltage level, a predetermined voltage level of between 0VDC and about 6VDC, and a predetermined current level, and that generates the cell state message using the state selection.

8. A method of simulating an operation of an electrical device using a system having a rack containing a plurality of modular cells, each having individually-addressable microcontrollers in networked communication with a communications module, the method comprising:
transmitting, via a host machine, a cell state message for each of a plurality of cells to a communications module using the controller area network (CAN) protocol, wherein each of the modular cells includes a semiconductor switch configured to apply a predetermined pulse width modulation (PWM) duty cycle to an AC input power signal to thereby generate a calibrated DC output voltage, and wherein the transmitted cell state messages each include a cell address and a desired simulation state for that cell;
receiving and converting, via the communications modules, the cell state messages into a corresponding set of serial messages;
transmitting the serial messages to microcontrollers of the respective cells to thereby cause the cells to set their state to the desired simulation state;
generating a desired simulation state in each of the modular cells using PWM via a second semiconductor switch; and
transmitting a cell status message back to the host machine via the communications module, including transmitting reporting at least one of a voltage level and a current level of the respective cells.

9. The method of claim 8, further comprising:
mounting each of a plurality of printed circuit board assemblies (PCBAs) on a respective rack;
positioning each rack within a respective bay of a cabinet; and
establishing a network connection between the host machine and each of the PCBAs in the cabinet.

10. The method of claim 8, wherein receiving and converting, via the communications modules, the cell state messages into a corresponding set of serial messages includes converting each cell state message into an RS-232 message.

11. The method of claim 8, further comprising:
receiving an AC signal from the input power supply; and
converting the AC signal, via PWM, to an output voltage of about 5VDC to 6VDC using the PSM.

12. The method of claim 8, wherein the host machine includes a user interface, the method further comprising:
receiving a state selection request via the host machine using the user interface, wherein the state selection request includes one of an open-circuit voltage level, a short-circuit voltage level, a predetermined voltage level of between 0VDC and about 5VDC, and a predetermined current level, and that generates the cell state message using the state selection.

13. A system for simulating an operation of a multi-cell electrical device, the system comprising:
a cabinet defining a plurality of bays, wherein the cabinet is connectable to AC line power;
a plurality of racks, each of which is positioned within a respective one of the bays; and
a host machine having a user interface that allows a user to individually select a desired simulation state for simulating performance of a corresponding cell of the multi-cell electrical device, wherein the host machine is in networked communication with each of the racks of the cabinet via a set of controller area network (CAN) messages;
wherein:
each rack includes a printed circuit board assembly (PCBA) having a plurality of power switching modules (PSMs) and an equal plurality of modular cells driven by an output voltage from a respective one of the PSMs;
the PCBA is configured to convert a received CAN message from the host machine into an RS-232 serial message, and to transmit the RS-232 serial message to a particular one of the modular cells identified in the CAN message; and
each modular cell includes a microcontroller that controls a semiconductor switching process aboard that particular modular cell to thereby set a state of that modular cell to a desired state, with the desired state being identified in the received CAN message.

14. The system of claim 13, wherein the CAN message from the host machine contains a rack identifier, a cell address, and a desired cell state, and wherein each PCBA includes a communications module configured to convert the received CAN message into the RS-232 serial message.

15. The system of claim 13, wherein the PSMS each include a semiconductor switch that applies a predetermined PWM duty cycle to the AC input power to generate a calibrated DC output voltage, and each modular cells includes a second semiconductor switch that applies another predetermined PWM duty cycle to produce the desired state for that particular cell.

16. The system of claim 13, wherein the second semiconductor switch includes a p-type MOSFET, a comparator, and an op-amp circuit, wherein the comparator requests an increase in an output voltage of the op-amp circuit when the output voltage of the op-amp circuit is less than a buffered PWM signal into the comparator.

17. The system of claim 13, wherein the cabinet contains six of the racks, and wherein each of the six racks contains sixteen of the PSMs and sixteen of the modular cells.

* * * * *